F. L. MORGAN.
AUTOMATIC NEST.
APPLICATION FILED APR. 12, 1919.
1,324,612.
Patented Dec. 9, 1919.
2 SHEETS—SHEET 2.
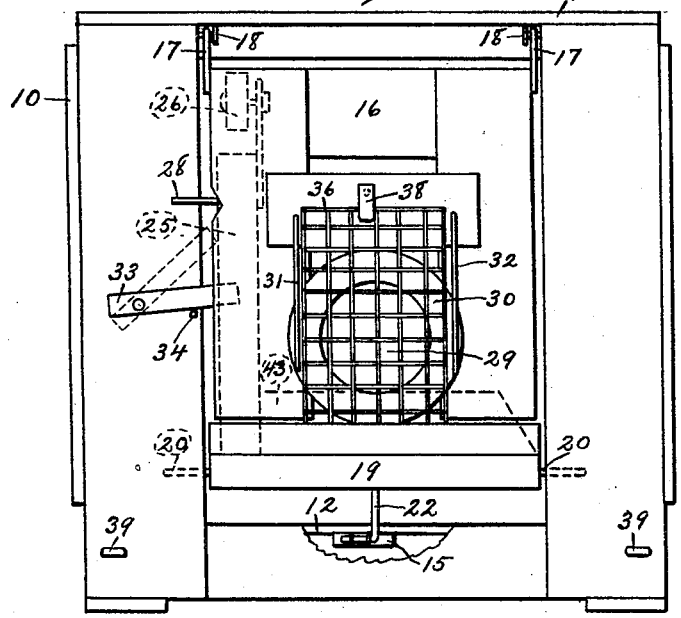
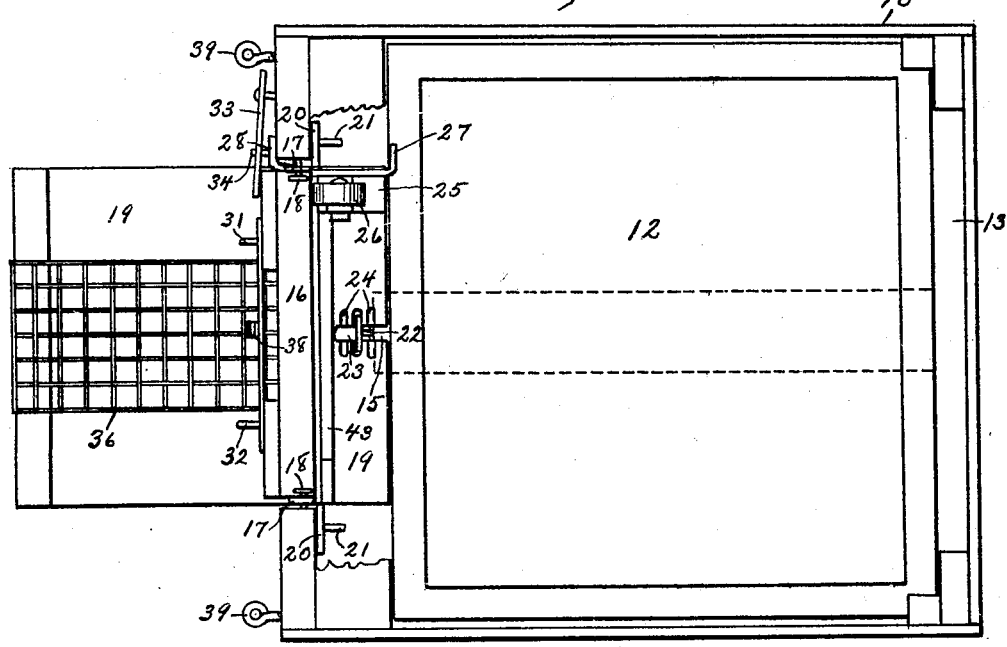
INVENTOR:
F. L. MORGAN
By Earl M. Sinclair
Atty.

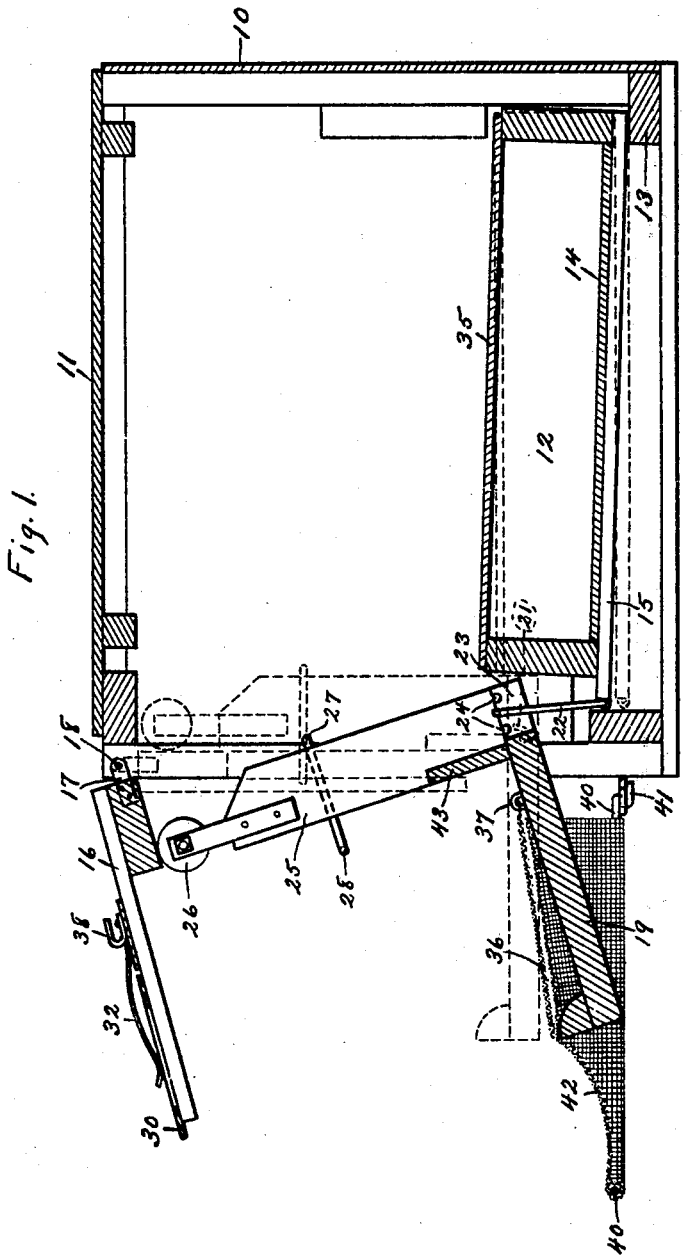

UNITED STATES PATENT OFFICE.

FRANCIS LEE MORGAN, OF OLDS, IOWA.

AUTOMATIC NEST.

1,324,612.

Specification of Letters Patent.

Patented Dec. 9, 1919.

Application filed April 12, 1919. Serial No. 290,300.

*To all whom it may concern:*

Be it known that I, FRANCIS L. MORGAN, a citizen of the United States of America, and resident of Olds, Henry county, Iowa, have invented a new and useful Automatic Nest, of which the following is a specification.

The object of this invention is to provide an improved construction for an automatic nest adapted to be used selectively as a laying or setting nest, a trap nest or a brood coop.

A further object of this invention is to provide improved means to insure seclusion and quiet to a laying or setting hen and prevent other fowls from disturbing her while on the nest.

A further object of this invention is to provide an improved construction for a trap nest by which a hen is permitted to leave the nest at will but other fowls are prevented from thereafter occupying the nest until the attendant has removed and identified the egg.

A further object of this invention is to provide means for quickly transforming the nest from an automatic device, by which fowls are permitted to enter and leave at will and are insured seclusion while in the nest, to a positive trap nest by which means is provided for identifying eggs deposited by individual fowls.

A further object of this invention is to provide means for quickly transforming an automatic or trap nest into a brood coop supplied with apron devices for the chicks and also provided with means for preventing the chicks from leaving the nest and preventing rodents from having access thereto.

A further object of this invention is to provide a simple and effective device of the class described which will be inexpensive of construction and will not readily get out of repair.

My invention consists in the construction, arrangement and combination of elements hereinafter set forth, pointed out in my claims and illustrated by the accompanying drawing, in which—

Figure 1 is a longitudinal section of my improved nest in open position, dotted lines indicating closed position of the parts, a removable cover for the nest box being shown in place as required for use when the device is employed as a brood coop, a removable apron device also being shown in place. Fig. 2 is a front elevation of the nest in closed position, the screen for the doorway being also shown in closed position. Fig. 3 is a plan of the nest in open position, the housing cover being removed.

In the construction of the device as shown a housing 10 is provided, preferably rectangular in plan and elevation and constructed of wood or wood and other suitable material. The housing 10 is provided with a removable cover 11. The bottom of the housing need not be solid but may be slatted as shown, to facilitate keeping it clean; and the side walls of the housing preferably are of less height than the complete device, being spaced both from the top and bottom margins thereof, to provide means for ventilating the interior. A nest box 12 is removably mounted in the housing 10 and preferably occupies substantially the complete width and length thereof, and said nest box rests loosely at its rear margin on a lower rear cross bar 13 of the housing, the forward end of the nest box being adapted for a limited vertical movement. The bottom 14 of the nest box preferably rests loosely on longitudinal slats 15 (one of which is shown) carried by the wall members, and said bottom is removable and replaceable. A doorway is formed in the front of the housing 10 and a door 16 is hung in and adapted to close the major portion of said doorway, said door being hinged on a horizontal axis by means of clips 17 fixed to and extending above its upper corners and pivoted on studs 18 carried by and projecting inwardly from upper portions of the door jamb members. A trip board 19 is mounted in the lower portion of the doorway of the housing, beneath the door 16, and has its major portion extending forwardly from the housing. The trip board 19 is provided with trunnions 20 resting loosely on studs 21 carried by the rear faces of the door jamb members, whereby the trip board is mounted for oscillation in the doorway. The forward end of the nest box 12 is pivotally suspended from the rear end portion of the trip board 19, preferably as follows: The central slat 15 of the nest box is extended forwardly beneath the rear portion of the trip board, and a link 22 is pivoted at its lower end to the forward end of said slat. A rearwardly opening slot 23 is formed in the rear portion of the trip board and centrally thereof and the link 22 extends loosely through said slot and engages the upper surface of the trip board. I have shown the link 22 as T-shaped in its upper portion, whereby it may engage the trip board on both sides of the slot 23; and a plurality of seats, such as grooves or depressions 24, may be formed in the upper surface of said trip board to receive said link selectively, thus providing means for adjusting the leverage of the nest relative to the trip board. An upright 25 is fixed to one rear corner of and rises from the trip board 19 and a roller 26 is carried by the upper end of said upright. When the trip board 19 is oscillated forwardly the roller 26 engages the rear surface of the door 16 and swings said door to open position; and when said trip board has been oscillated to its limit of movement forwardly said roller holds and maintains the door in open position, as shown in Fig. 1. Spaced stops 27, 28 are carried by and project laterally from the upright 25 and are adapted to engage respectively the rear and forward faces of the adjacent door jamb and limit forward and rearward oscillation of the trip board. The door 16 is formed with a relatively large aperture 29 opening to its lower margin, through which aperture the head and shoulders of a fowl may be inserted in the effort to escape from the housing.

In use the parts are assembled as shown and described, and to set the nest for entrance of a fowl thereto manual pressure is applied to the forward end of the trip board 19, which causes a forward oscillation of said trip board, a forward movement of the upper end of the upright 25 and consequent pressure of the roller 26 on the door 16 below its hinges, thus causing an opening movement of the door. As this movement continues the roller 26 rides forwardly against and then beneath the door, and when the trip board has been moved to its limit of movement, as defined by the stop 27, the upright 26 is in such position that the roller acts as a support for the door 16 and holds it in open position. A fowl desiring to enter the nest steps on the trip board, walks across it and steps upon the next box 12 and her weight causes a downward movement of the forward portion of the nest box and, through the link 22, a downward movement of the rear portion of the trip board. As the trip board is oscillated rearwardly the upright is moved so that the roller 26 is withdrawn from beneath the door 16, which falls by gravity to closing position within the doorway of the housing, thus preventing other fowls from entering and disturbing the occupant. When the fowl is ready to leave the nest she inserts her head and neck through the aperture 29 of the door 16 and pressure causes an opening movement of the door; and as the fowl steps upon the trip board the parts are moved to the open position, the door 16 being held open and permitting the entrance of the same or another fowl. When used in this manner the nest is entirely automatic in its operation and affords seclusion and freedom from disturbance to laying or setting hens.

It is desirable at times and for certain purposes to provide means for determining which fowls of a flock have been laying, and the extent of such activity. I therefore provide a plurality of rings, such as 30, which may be made of pasteboard or other suitable light material, and may be mounted removably over the aperture 29 of the door in such manner that they will be removed and carried away on the neck of a fowl leaving the nest. Light springs 31, 32 may be mounted on the forward face of the door 16, on opposite sides of the aperture 29, and the rings 30 be mounted singly beneath and held yieldingly over the aperture by means of said springs, the opening of the ring coinciding with the aperture 29 so that as a fowl inserts her head through the aperture 29 to leave the nest she also inserts it through the ring and carries it away with her, the ring slipping by endwise movement from the ends of the springs 31, 32 as the head and neck of the fowl emerge from the open end of the aperture 29.

It is also desirable at times to identify the particular eggs laid by individual fowls so that they may be set separately, or for other purposes. A latch 33 is pivoted on the forward face of one of the door jambs, and a stop 34 is mounted on said jamb between the pivot of the latch 33 and the doorway. When the latch 33 is turned inwardly to the position shown in Fig. 2, and is supported in substantially horizontal position by the stop 34, said latch projects across the path of travel of the upright 25 and limits forward movement of said upright and of the trip board to such extent that the roller 26 does not move to supporting position beneath the door 16, which is permitted to drop to closed position after the fowl has passed out. Then the device must be set manually before another fowl can enter, the egg laid by the preceding fowl being removed by the attendant and marked with any suitable identifying means, such as a number corresponding to a number borne by the ring 30 previously mounted on the door. Then when the rings are subsequently removed from the fowls' necks notation is made as to which ring is borne by each individual, thus providing means for identifying the eggs laid by each individual.

If desired the latch 33 may be caused to engage in front of the door 16 in order to confine a fowl within the device. This is desirable when the device is to be used as a brood coop, chicks being permitted to pass to and from the housing by the aperture 29 of the door while the mother hen is confined in the housing. A cover board 35 may be loosely mounted on the nest box 12 if desired when the device is used in this manner. A screen 36, large enough to cover the aperture 29 of the door 16, preferably is pivoted by eyes or staples 37 to the trip board 19 and may be employed to cover and close said aperture at times when the device is used as a brood coop. The screen 36 may be held in closing position by a latch 38 pivoted on the upper portion of the door, as shown in Fig. 2, and it will then prevent chicks from leaving the housing, as at night, and also prevent the entrance of rodents through the door opening. When not in use the screen 36 may rest loosely on the trip board.

I also provide an apron device for attachment to the housing when desired, as when the device is used as a brood coop. Screw eyes 39 are mounted in lower portions of the front members of the housing 10 and a wire frame 40, of yoke shape, is formed with hooks 41 on its ends adapted to engage in said eyes and support the frame in substantially horizontal position and extending forwardly from the housing. A soft cover 42 of textile fabric is mounted on the frame 40 and is loose enough so that it can be drawn over the tripping board 19 as shown in Fig. 1, and beneath the screen 36.

A cross piece 43 may be mounted on and transversely of the tripping board 19 adjacent the doorway to the housing and close the space between said tripping board and the lower end of the closed door 16, so that a fowl is forced to insert her head through the aperture 29 of the door in emerging from the nest.

When it is desired to use the device as an automatic nest for laying or setting hens, as first above described, the latch 33 may be turned outwardly on its pivot to inoperative position.

The apron formed of frame 40 and cover 42 provides a means for little chicks to climb upon the trip board and get into the nest when used as a brooder, and prevents their getting under the trip board and becoming chilled.

I claim as my invention—

1. A device of the class described, comprising a housing formed with an entrance opening, a nest box mounted in said housing, a door hinged at its upper margin in said entrance opening, a trip board pivoted to said housing and arranged for oscillation in the lower portion of said entrance opening, the forward portion of said nest box being suspended from said trip board at the rear of the pivot of said trip board, and means carried by said trip board for engaging and moving said door to open position.

2. A device of the class described, comprising a housing formed with an entrance opening, a nest box mounted in said housing, a door hinged at its upper margin in said entrance opening, a trip board mounted for oscillation in the lower portion of said entrance opening, the forward portion of said nest box being pivotally connected to the rear portion of said trip board, and means carried by said trip board for engaging said door and holding it in open position when said trip board is oscillated forwardly.

3. A device of the class described, comprising a housing formed with a doorway, a member mounted for limited movement in a vertical plane in said housing, a door hinged at its upper margin in said doorway, a trip board mounted for oscillation in said doorway beneath said door, means for suspending the forward end of said vertically movable member from the rear portion of said trip board, said suspending means being adjustable relative to the pivot of said trip board, and an upright carried by the rear portion of said trip board and adapted to engage the rear surface of said door below the pivot thereof.

4. A device of the class described, comprising a housing formed with a doorway, a member mounted for limited movement in a vertical plane in said housing, a door hinged at its upper margin in said doorway, a trip board mounted for oscillation in said doorway beneath said door, means for suspending the forward portion of said vertically movable member from the rear portion of said trip board, an upright carried by the rear portion of said trip board, and a roller journaled on the upper end of said upright and adapted to engage said door on its rear face.

5. A device of the class described, comprising a housing formed with a doorway, a member mounted for limited movement in a vertical plane in said housing, a door hinged at its upper margin in said doorway, a trip board mounted for oscillation in said doorway beneath said door, means for suspending the forward portion of said vertically movable member from the rear portion of said trip board, an upright carried by the rear portion of said trip board and adapted to engage the rear face of said door, and means for limiting oscillation of said trip board and upright in either direction.

6. A device of the class described, comprising a housing formed with a doorway, a member mounted for limited movement in a vertical plane in said housing, a door hinged at its upper margin in said doorway and formed with a downwardly opening notch, a trip board mounted for oscillation in said doorway beneath said door, means for suspending the forward portion of said vertically movable member from the rear portion of said trip board, an upright on said trip board for engaging and oscillating said door, said upright being adapted to hold said door in open position when moved to its limit of forward movement, and a latch pivoted on said housing and adapted to be moved to position to further limit forward movement of said upright and prevent holding engagement thereof with the door.

7. A device of the class described, comprising a housing formed with a doorway, a nest box mounted therein, a door hinged in said opening and formed with a downwardly opening notch, a trip board mounted for oscillation in said doorway, means for suspending the forward portion of said nest box from the rear end of said trip board, means on said trip board for engaging and oscillating said door, and a screen pivoted on said trip board and adapted to be held in upright position at times across the notch in said door.

Signed at Olds, in the county of Henry and State of Iowa, this 6 day of April, 1918.

FRANCIS LEE MORGAN.